(12) United States Patent
Ferouz et al.

(10) Patent No.: US 6,612,584 B1
(45) Date of Patent: Sep. 2, 2003

(54) FLANGE AND SEAL ASSEMBLY

(75) Inventors: Carmella Ferouz, Rockville, MD (US); Brian Bayne, Odenton, MD (US); Joseph Kim, Frederick, MD (US); Stephen B. Rowland, Laurel, MD (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 10/125,354

(22) Filed: Apr. 19, 2002

(51) Int. Cl.⁷ ............................. F16L 17/06; F16L 17/00
(52) U.S. Cl. .............................. 277/609; 277/616
(58) Field of Search .................... 277/602, 603, 277/606, 608, 609, 614, 616, 625, 630, 640, 641

(56) References Cited

U.S. PATENT DOCUMENTS

| | | | | |
|---|---|---|---|---|
| 3,797,836 A | * | 3/1974 | Halling | 277/608 |
| 3,820,799 A | * | 6/1974 | Abbes et al. | 277/647 |
| 4,199,151 A | * | 4/1980 | Bartos | 277/306 |
| 4,218,067 A | * | 8/1980 | Halling | 277/605 |
| 4,361,335 A | * | 11/1982 | Vinciguerra | 277/633 |
| 5,630,593 A | * | 5/1997 | Swensen et al. | 277/626 |
| 5,716,052 A | * | 2/1998 | Swensen et al. | 277/608 |
| 5,730,445 A | * | 3/1998 | Swensen et al. | 277/608 |
| 6,164,656 A | * | 12/2000 | Frost | 277/312 |

* cited by examiner

Primary Examiner—Anthony Knight
Assistant Examiner—Vishal Patel
(74) Attorney, Agent, or Firm—Shinjyu Global IP Counselors, LLP

(57) ABSTRACT

A flange and seal assembly is provided with an annular sealing ring and a mounting component. The annular sealing ring is retained as a part of the mounting component. The mounting component has a mounting end with a mounting flange extending outwardly from the mounting end, and an annular seal receiving recess formed in an axial end surface of the mounting end, and a retaining element extending from the mounting end. A portion of the sealing ring is axially retained between the retaining element and the axial end surface of the mounting end.

20 Claims, 14 Drawing Sheets

FLANGE AND SEAL ASSEMBLY

BACKGROUND OF THE INVENTION

1. Field of the Invention

This invention generally relates to a coupling assembly having a seal between a pair of mating members. More specifically, the present invention relates to a flange and seal assembly in which an annular sealing ring and a flanged mounting component are coupled together as a single self-contained unit or component.

2. Background Information

In piping systems, two pipes or tubular members are typically coupled together utilizing a four part coupling assembly. This four part coupling assembly typically comprises a pair of flanged components, a seal disposed between the flanged components and a coupling device securing the two flanged components together. In this typical coupling arrangement, the seal is a completely independent part from the two flanged components. In this type of configuration, the seal can inadvertently fall out from between the two flanged components. Thus, sometimes the installation of the connection between the two pipes can be difficult and/or time consuming. One attempt to solve this problem has been to produce sealing rings that are slightly out of round such that the sealing ring is slightly deformed when placed in a recess formed in an axial face of one or more of the flanged components. However, such an arrangement does not positively retain the seal to one of the flanged components. Thus, there is still a possibility that the seal will fall out during installation of the coupling assembly.

The above mentioned coupling assembly is often used in high pressure and high temperature piping systems. Numerous types and shapes of seals have been employed to prevent fluid from escaping from a joint in ducting systems or other components. Coupling assembly in the fluid path or in components having high pressures often use pressure energized seals or sealing rings between their joints or components. These sealing rings are resilient due to their material and their geometric design so that the sealing ring fills the gap between the adjacent members. Examples of sealing rings which are particularly well suited for applications described above, include U.S. Pat. No. 3,797,836, U.S. Pat. No. 4,121,843 to Hailing and U.S. Pat. No. 5,630,593 to Swensen at el.

In view of the above, there exists a need for an improved flange and seal assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a flange and seal assembly that is relatively simple to install.

Another object of the present invention is to provide a flange and seal assembly that is relatively inexpensive to manufacture.

Another object of the present invention is to provide a flange and seal assembly that can be used to replace an existing seal and an existing mounting component.

The foregoing objects can basically be attained by providing a flange and seal assembly comprising an annular sealing ring and a mounting component. The annular sealing ring includes a first seal end with a first annular sealing surface facing in a first axial direction and a second seal end with a second annular sealing surface facing in a second axial direction. The mounting component includes a mounting end with a mounting flange extending outwardly from the mounting end, and an annular seal receiving recess formed in an axial end surface of the mounting end, and a retaining element extending from the mounting end. A portion of the sealing ring is axially retained between the retaining element and the axial end surface of the mounting end such that the first axially facing sealing surface is located adjacent an axially facing seal contacting surface of the seal receiving recess.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
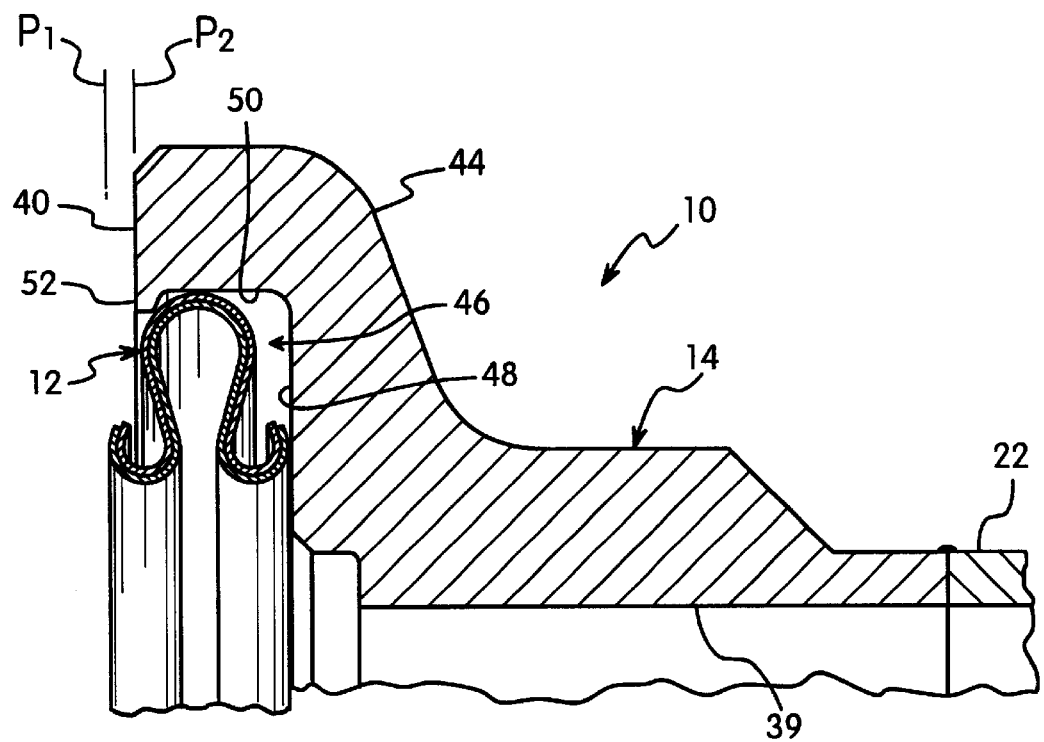
FIG. 1 is a partial enlarged cross-sectional view of a flange and seal assembly including an annular sealing ring and a flanged mounting component coupled together as a single self-contained unit or component in accordance with a first embodiment of the present invention.

Referring initially to FIG. 1, a flange and seal assembly 10 is illustrated in accordance with a first embodiment of the present invention. The flange and seal assembly 10 is designed to be used in a piping system. Of course, it would be apparent to those skilled in the art from this disclosure that the flange and seal assembly 10 can be modified to be used in other types of applications without departing from the scope of the present invention as defined in the appended claims. The flange and seal assembly 10 basically includes an annular sealing ring 12 and a first flanged mounting component 14. The annular sealing ring 12 is retained by the first flanged mounting component 14 such that the annular sealing ring 12 and the first flanged mounting component 14 function as a single self-contained unit or component.

The flange and seal assembly 10 can be utilized in a wide range of applications. The flange and seal assembly 10 is particularly useful in high pressure and/or high temperature sealing applications, but not limited thereto. Accordingly, the flange and seal assembly 10 can be designed for a wide range of sizes, materials and spring rate characteristics, etc. depending on the application. The aerospace industry and any other industry that requires the above stated functionality are also particularly well suited for the flange and sealing assembly 10 of the present invention.

In use, the flange and seal assembly 10 allows or improves installation and assembly of piping system. Also, the flange and seal assembly 10 allows for interchangeability with the traditional female flange and seal pair. The typical materials for the first and second flanged mounting components 14 and 16 include, but are not limited to, Titanium C.P., Inconel 718, and Cres 347. Typical materials for the sealing ring 12 include, but are not limited to, Inconel 718, Inconel X750, and Waspaloy. Of course, it would be apparent to the-skilled in the art from this disclosure that other suitable materials can be utilized for the first and second flanged components 14 and 16 and the sealing ring 12.

Figure 2:
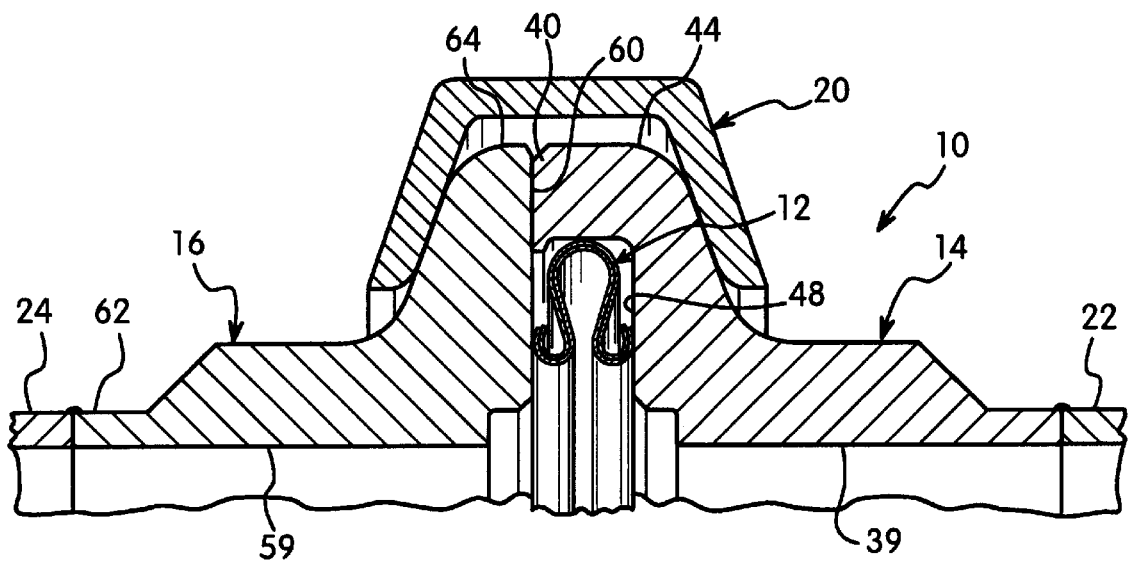
FIG. 2 is a partial cross-sectional view of the flange and seal assembly illustrated in FIG. 1 coupled to an mating flanged mounting component by a pipe coupling device.
Figure 3:
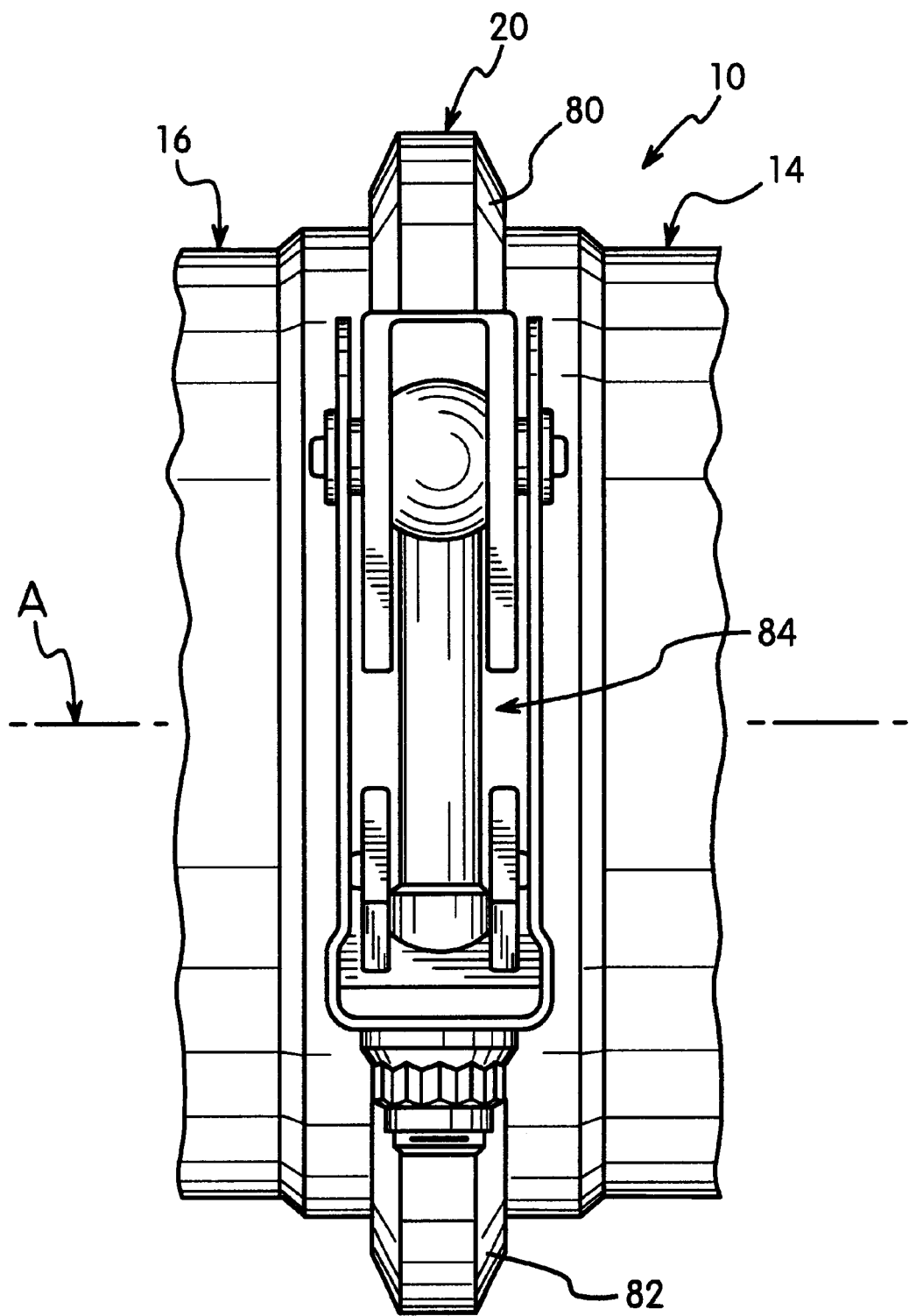
FIG. 3 is a partial side elevational view of the flange and seal assembly illustrated in FIG. 1 coupled to the mating flanged mounting component by the pipe coupling device as illustrated in FIG. 2.

Referring now to FIGS. 2 and 3 showing the first illustrated embodiment, the first flanged mounting component 14 mates with a second flanged mounting component 16 of a piping system. A pipe coupling device or arrangement 20 is used to fixedly couple the first and second flanged mounting components together in a conventional manner. The first and second flanged mounting components 14 and 16 are welded to first and second pipes 22 and 24, respectively, of the piping system. It will be apparent to those skilled in the art from this disclosure that the flange and seal assembly 10 can be utilized in other types of configurations. For example, the flange and seal assembly 10 can be produced in a circular configuration as illustrated herein as well as non-circular configurations. Moreover, the flange and seal assembly 10 can be produced in a variety of heights, materials, etc., as will become apparent to those skilled in the art from this disclosure. In other words, the flange and seal assembly 10 can be produced in a wide range of diameters, shapes, heights, coatings, base materials chosen for coefficient of thermal expansion, etc.

The annular sealing ring 12 is a continuous ring shaped member that preferably has a substantially uniform cross sectional profile. In the illustrated embodiment, the annular sealing ring 12 is constructed of two plies or annular members made of a resilient, metallic material. The annular sealing ring 12 is preferably constructed in accordance with U.S. Pat. No. 5,630,593 to Swensen at el. The entire disclosure of U.S. Pat. No. 5,630,593 is hereby incorporated herein by reference in order to better understand the construction of the annular sealing ring 12 herein. Of course, it would be apparent to those skilled in the art from this disclosure that other types of annular sealing rings can be utilized in the present invention without departing from the scope of the present invention as defined in the appended claims. For example, the annular sealing ring 12 can be replaced with a pressure energized sealing ring having a C-shaped cross-sectional profile or an E-shaped cross-sectional profile such as described in U.S. Pat. No. 4,121,843.

Since the annular sealing ring 12 is described in detail in U.S. Pat. No. 5,630,593, the annular sealing ring 12 will not be discussed and/or illustrated in detail herein. Rather, the annular sealing ring 12 will only be discussed herein as necessary to understand the present invention.

Figure 4:
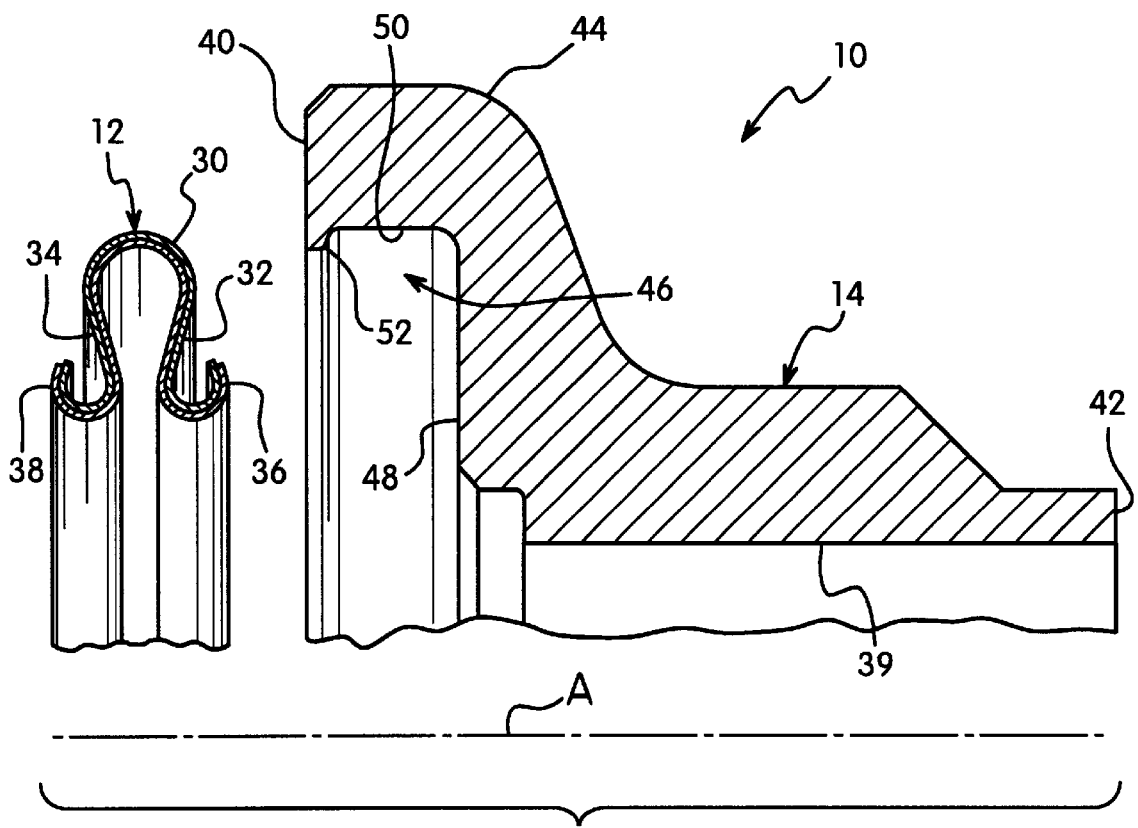
FIG. 4 is a partial exploded cross-sectional view of the flange and seal assembly illustrated in FIGS. 1–3.

As seen in FIG. 4, basically, the annular sealing ring 12 has an annular bight portion 30, a first annular leg portion 32 extending from one end of the bight portion 30, and a second annular leg portion 34 extending from the other end of the bight portion 30. The first annular leg portion 32 has a curved free end that forms a first annular sealing surface 36 that faces in a first axial direction. Similarly, the second annular leg portion 34 has a curved free end that forms a second annular sealing surface 38 facing in a second axial direction. In this illustrated embodiment, the first and second annular sealing surfaces 36 and 38 are circular and concentrically arranged about the center axis A of the flange and seal assembly 10.

Figure 5:
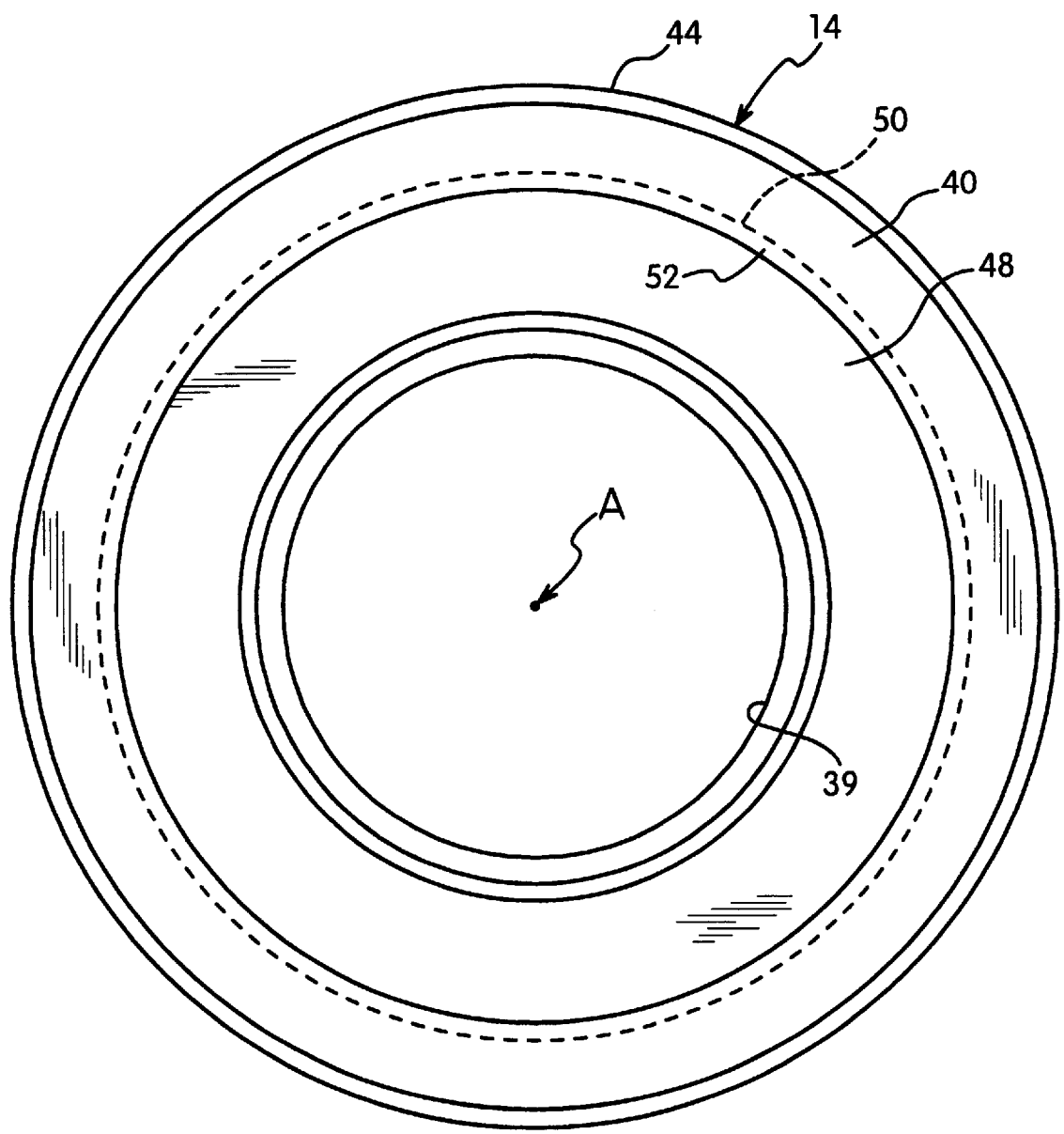
FIG. 5 is a left axial end elevational view of the flanged mounting component of the flange and seal assembly illustrated in FIGS. 1–4.

As seen in FIGS. 4 and 5, the first flanged mounting component 14 is preferably a tubular member that includes an interior passage 39 extending between a first open mounting end 40 and a second open mounting end 42. The first end 40 is adapted to be fixedly coupled to the second flanged mounting component 16 by the pipe coupling device 20. The second end 42 is adapted to be fixedly coupled to the first pipe 22 by welding. The first end 40 has an annular or peripheral mounting flange 44 extending outwardly in a radial direction from outer surface of the first mounting end. The first mounting end 40 also has an annular seal receiving recess 46 formed concentric with the interior passage 39 at the first mounting end 40. The annular seal receiving recess 46 is basically defined by an axially facing seal contacting surface 48, a peripheral surface 50 extending in an axial direction from the seal contacting surface 48, and a retaining element 52 extending inwardly in a radial direction from the peripheral surface 50.

In this preferred embodiment, the retaining element 52 is integrally formed as a non separable part of the first mounting end 40. In this embodiment, the retaining element 52 is a continuous annular lip. However, it would be apparent to those skilled in the art from this disclosure that the retaining element 52 does not have to be a continuous annular lip. Of course, inner diameter of the retaining element 52 is smaller than the outer diameter or peripheral dimension of the bight portion 30 of the sealing ring 12 so as to retain the sealing ring 12 in the annular seal receiving recess 46.

The bight portion 30 of the sealing ring 12 is retained in the annular seal receiving recess 46 such that the annular sealing ring 12 and the first flanged mounting component 14 function as a single self-contained unit or component. More specifically, the bight portion 30 of the sealing ring 12 is retained axially between the seal contacting surface 48 and the retaining element 52 such that the first axially facing sealing surface 36 is located adjacent the seal contacting surface 48 of the seal receiving recess 46.

As seen in FIG. 1, when the sealing ring 12 is installed in the seal receiving recess 46, the bight portion 30 of the sealing ring 12 is radially spaced from the peripheral surface 50 of the seal receiving recess 46. In other words, the bight portion 30 does not normally contact the peripheral surface 50 of the seal receiving recess 46. Preferably, the retaining element 52 is also slightly spaced from the bight portion 30 in the radial direction. Thus, the first flanged mounting component 14 does not restrict deflection of the annular sealing ring 12 when the annular sealing 12 is being compressed between the first and second flanged mounting component 14 and 16.

The annular seal receiving recess 46 preferably has a substantially cylindrical shape that accommodates the shape of the sealing ring 12. In the illustrated embodiment, the sealing ring 12 and the annular seal receiving recess 46 have circular annular shapes. It would be apparent to those skilled in the art from this disclosure that the sealing ring 12 and the annular seal receiving recess 46 can have other annular shapes. For example, the sealing ring 12 and the seal receiving recess 46 can have oval shapes or substantially rectangular shapes.

When the annular sealing ring 12 is retained within the annular seal receiving recess 46, the second annular sealing surface of the sealing ring 12 lies in a plane $P_1$ that is spaced from the plane $P_2$ of the free end of the first mounting end 40 of the first flanged mounting component 14. Accordingly, the first and second flanged mounting components 14 and 16 are coupled together by the pipe coupling device 20. The second annular sealing surface 38 is deflected axially towards the first annular sealing surface 36 to create an annular seal between the first and second flanged mounting components 14 and 16.

Figure 6:
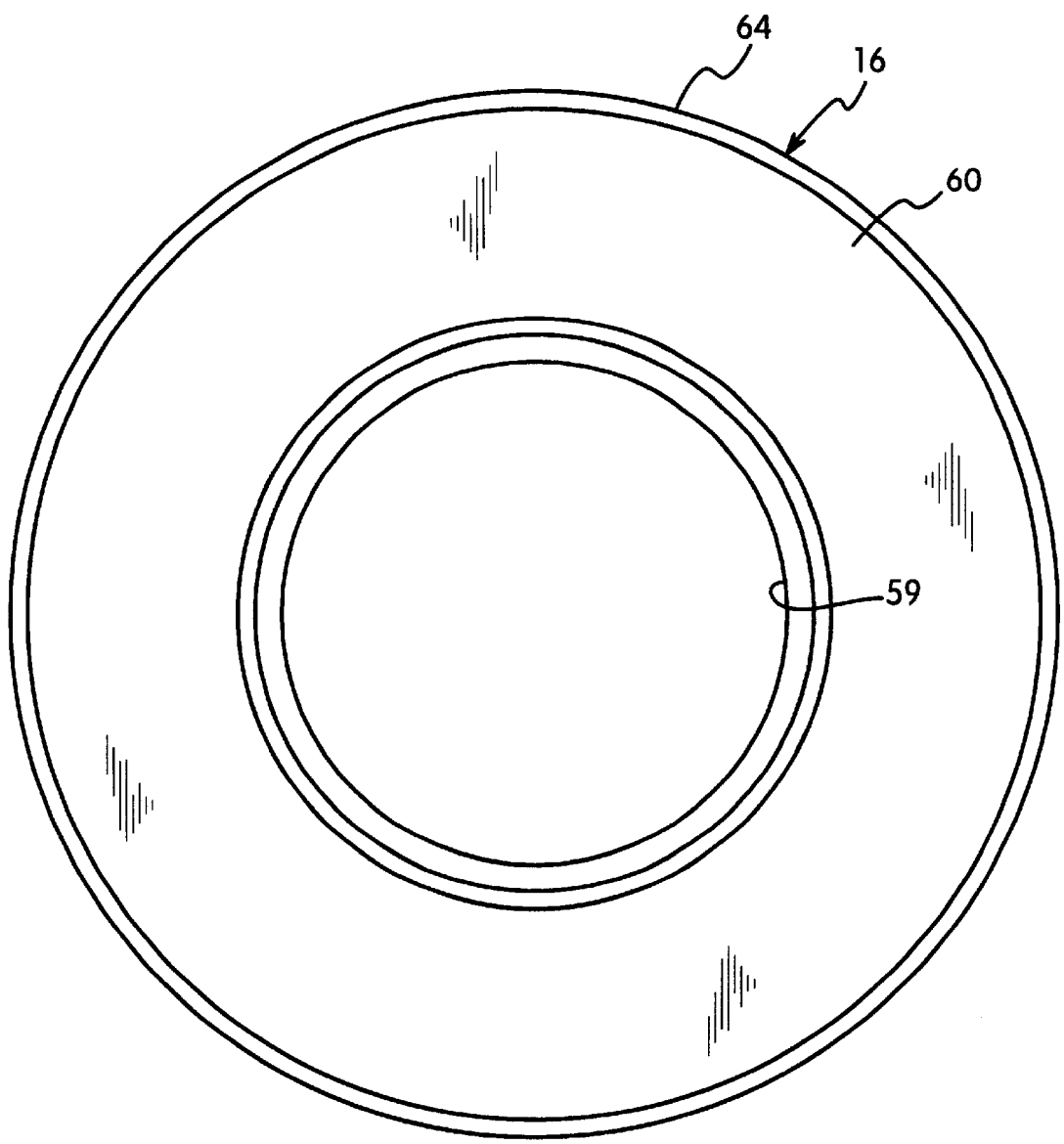
FIG. 6 is a right axial end elevational view of the mating flanged mounting component illustrated in FIGS. 2 and 3.
Figure 7:
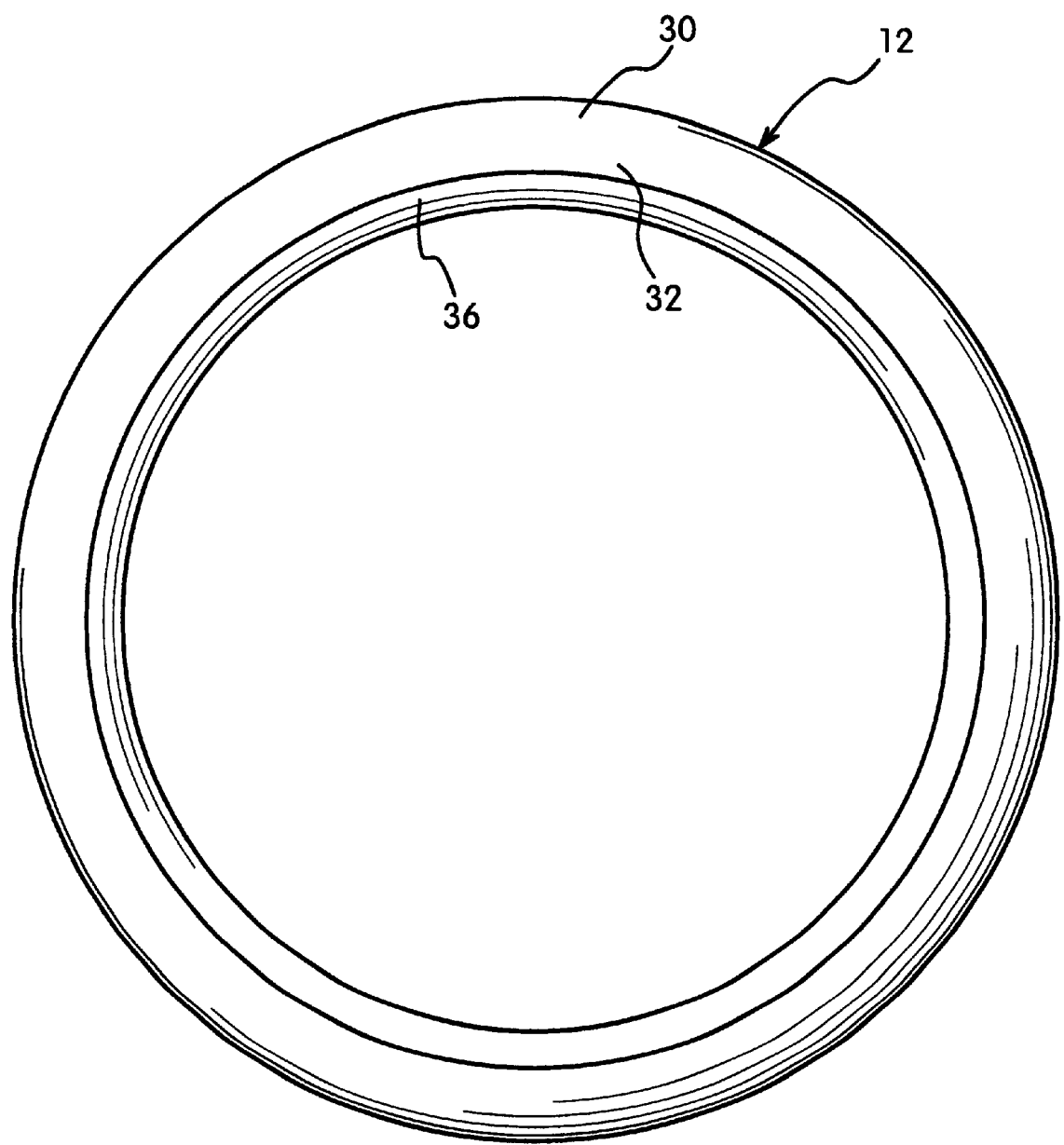
FIG. 7 is a left axial end elevational view of the annular sealing ring of the flange and seal assembly illustrated in FIGS. 1–4.

Referring now to FIGS. 2 and 6, the second flanged mounting component 16 is preferably a tubular member that includes an interior passage 59 extending between a first open mounting end 60 and a second open mounting end 62. The first mounting end 60 is adapted to be coupled to the first flanged mounting component 14 by the pipe coupling device 20. The second mounting end 62 is adapted to be fixedly coupled to the second pipe 24 by welding. The first mounting end 60 has an annular mounting flange 64 that extends outwardly from the first mounting end 60. The annular mounting flange 44 has an axially facing seal contacting surface 72 that engages the second annular sealing surface 38 of the annular sealing ring 12 when the first and second flanged mounting components 14 and 16 are coupled together by the pipe coupling device 20.

As seen in FIGS. 2 and 3, the pipe coupling device 20 basically includes a pair of retainers 80 and 82, a hinge assembly (not shown) for pivotally coupling one of the ends of retainers 80 and 82 together, and a latch assembly 84 for releasably coupling the other ends of retainers 80 and 82 together. The retainers 80 and 82 engage the slanted contact surfaces of the peripheral or annular mounting flanges 44 and 64 of components 14 and 16. The pipe coupling device 20 is a conventional component that is well known in the art. Therefore, the pipe coupling device 20 will not be discussed and/or illustrated in detail herein.

Figure 8:
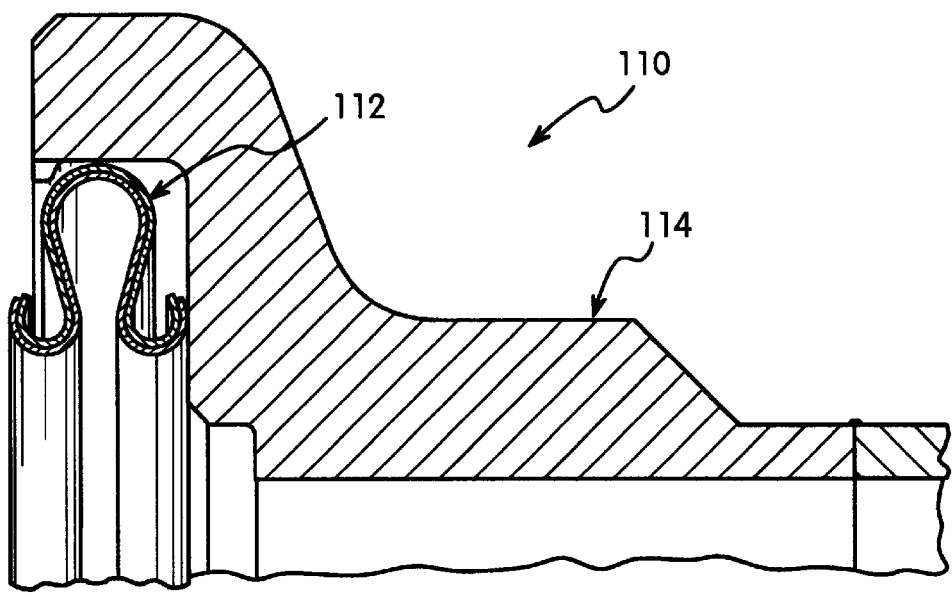
FIG. 8 is a partial enlarged cross-sectional view of a flange and seal assembly including an annular sealing ring and a flanged mounting component coupled together as a single self-contained unit or component in accordance with a second embodiment of the present invention.
Figure 9:
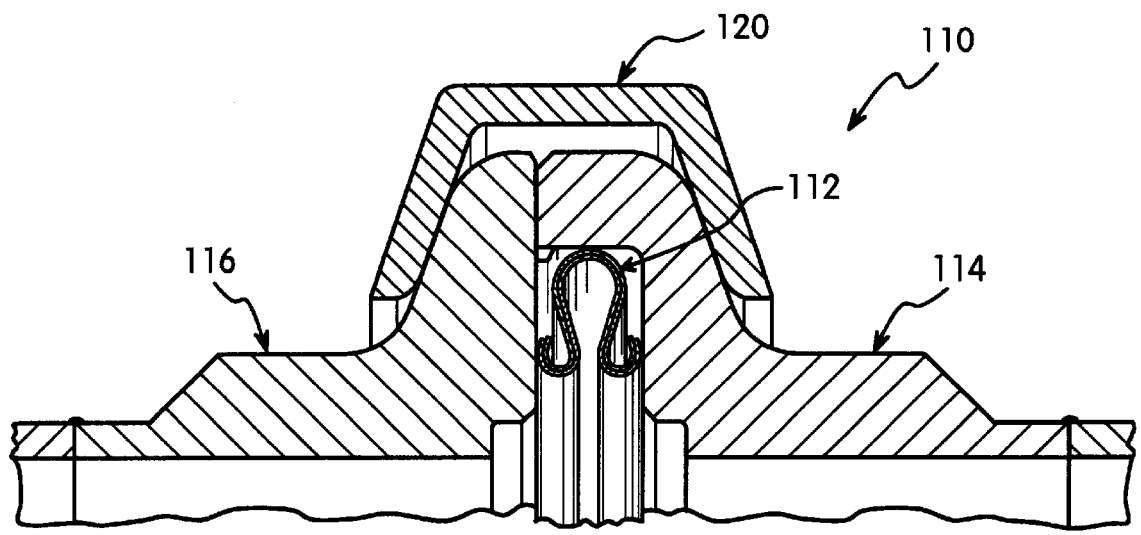
FIG. 9 is a partial cross-sectional view of the flange and seal assembly illustrated in FIG. 8 coupled to a mating flanged mounting component by a pipe coupling device.
Figure 10:
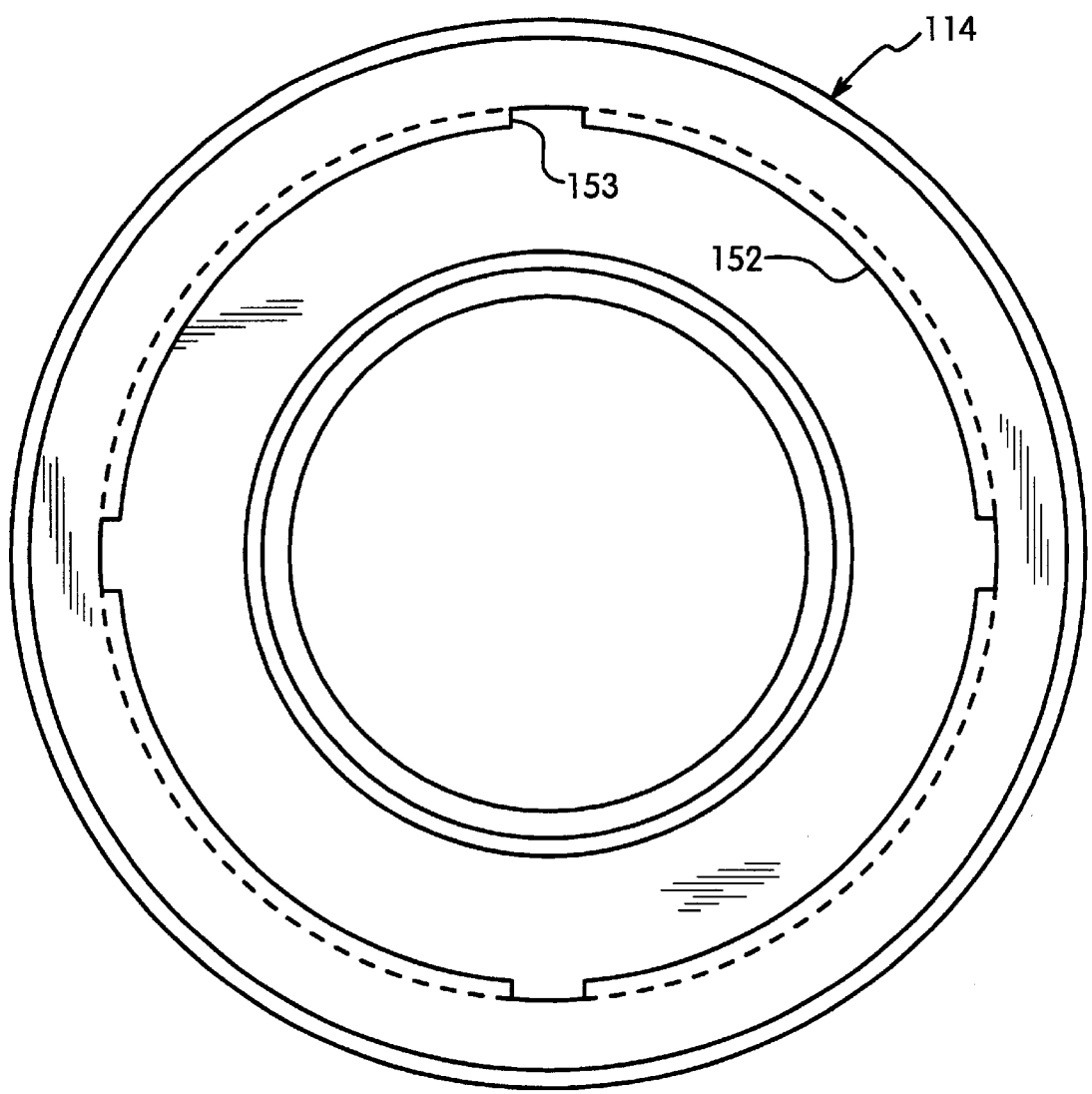
FIG. 10 is a left axial end elevational view of the flanged mounting component of the flange and seal assembly illustrated in FIGS. 8 and 9.
Figure 11:
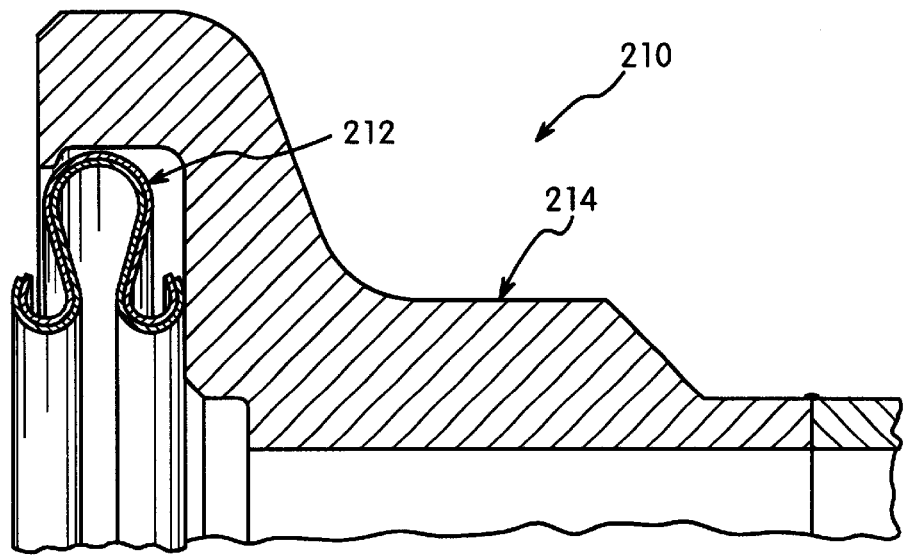
FIG. 11 is a partial enlarged cross-sectional view of a flange and seal assembly including an annular sealing ring and a flanged mounting component coupled together as a single self-contained unit or component in accordance with a third embodiment of the present invention.
Figure 12:
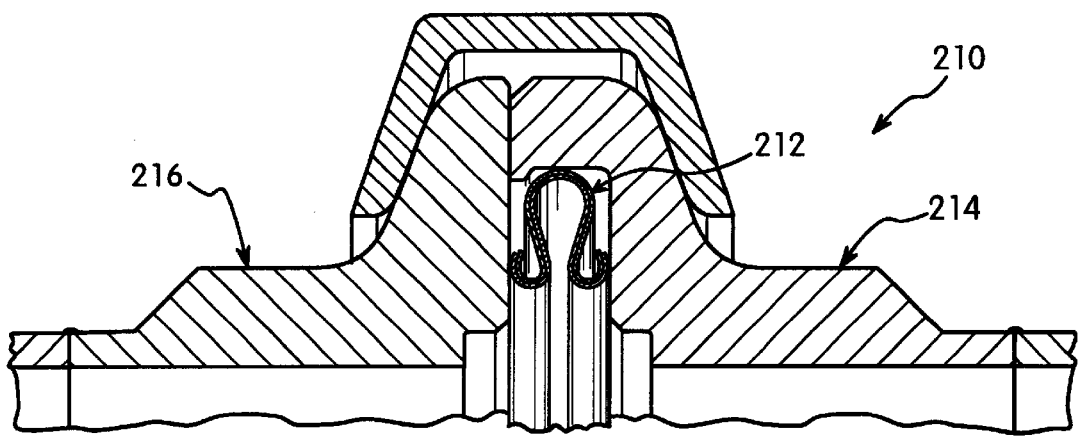
FIG. 12 is a partial cross-sectional view of the flange and seal assembly illustrated in FIG. 11 coupled to a mating flanged mounting component by a pipe coupling device.
Figure 13:
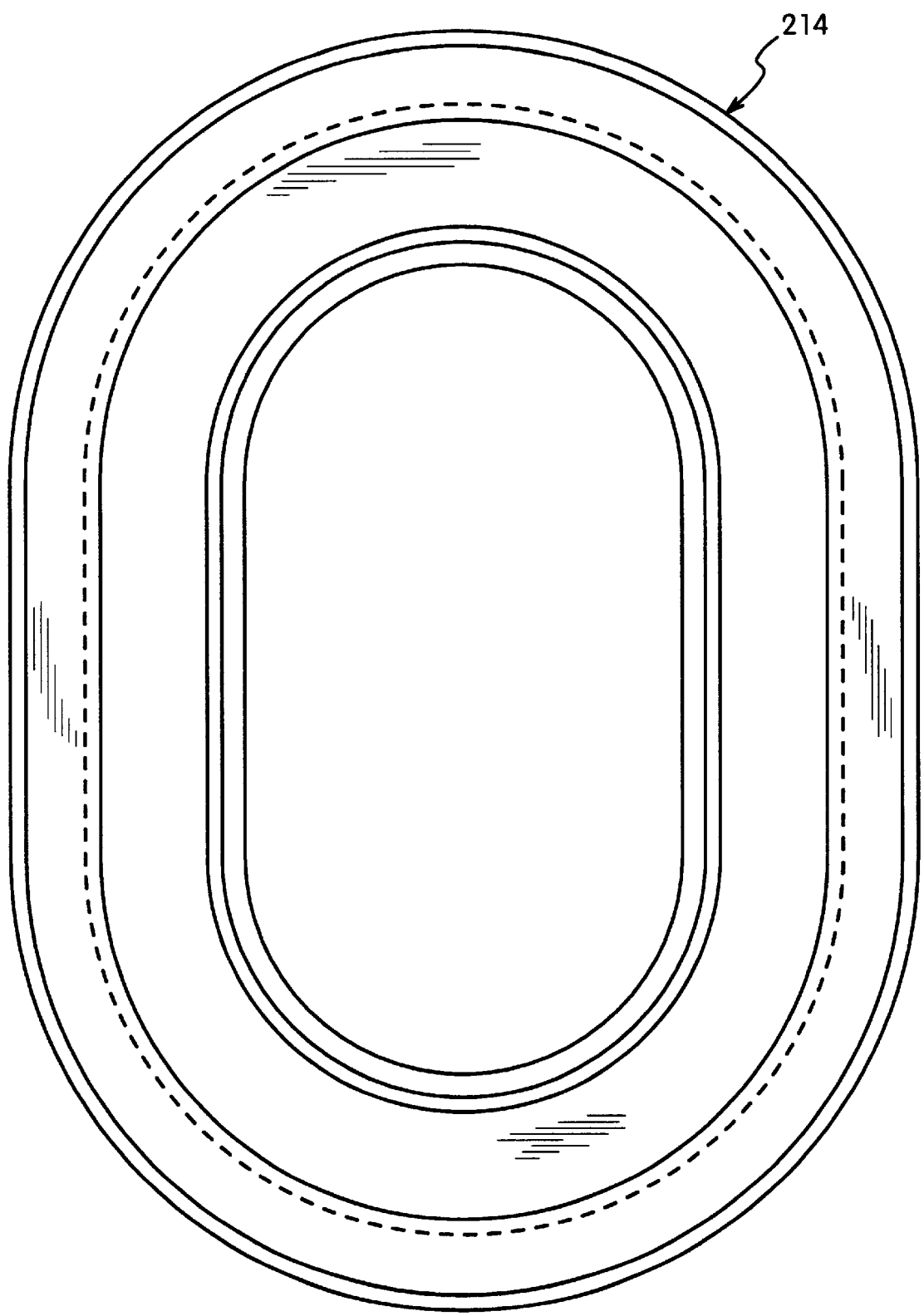
FIG. 13 is a left axial end elevational view of the flanged mounting component of the flange and seal assembly illustrated in FIGS. 11 and 12.
Figure 14:
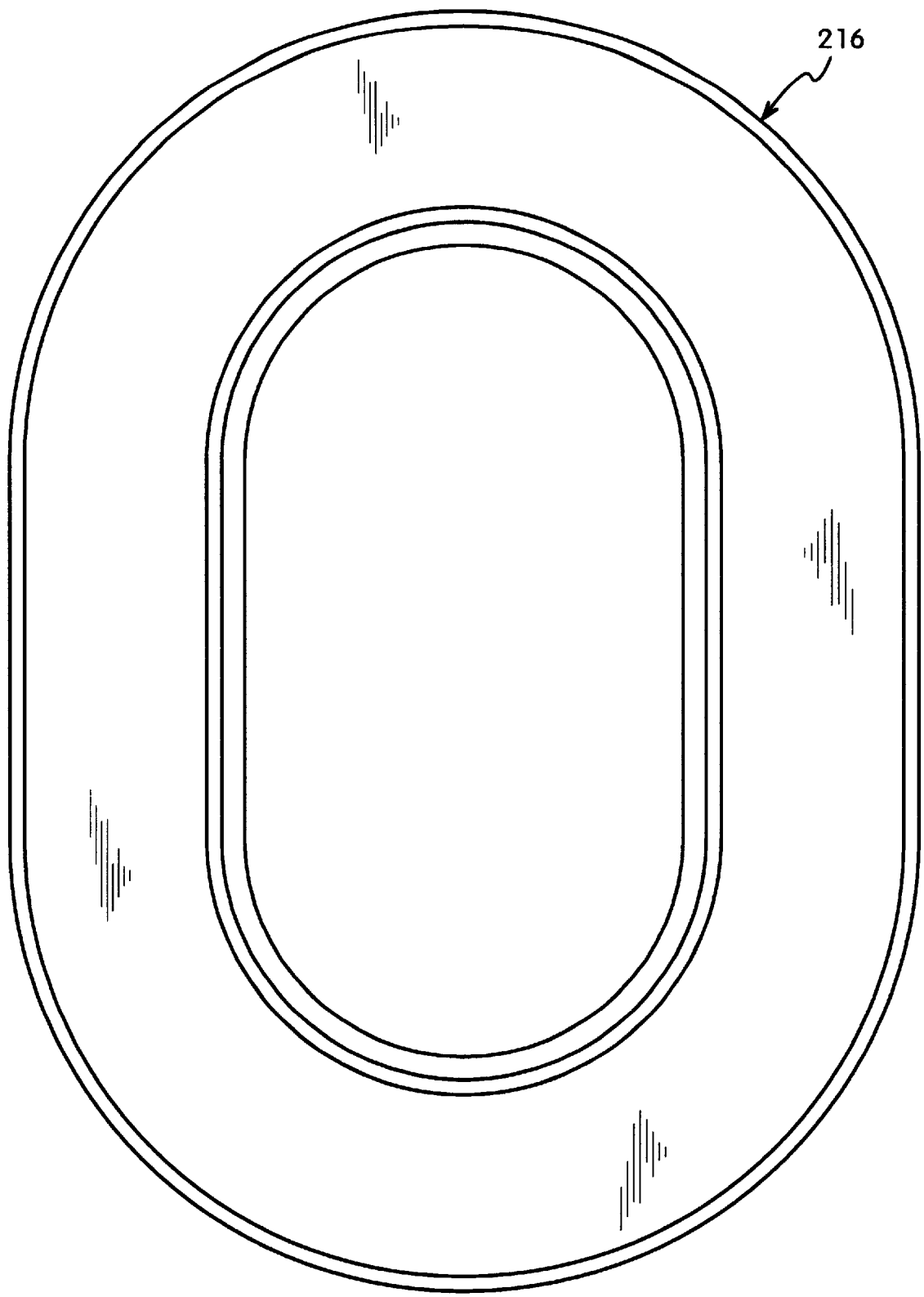
FIG. 14 is a right axial end elevational view of the mating flanged mounting component illustrated in FIG. 12.
Figure 15:
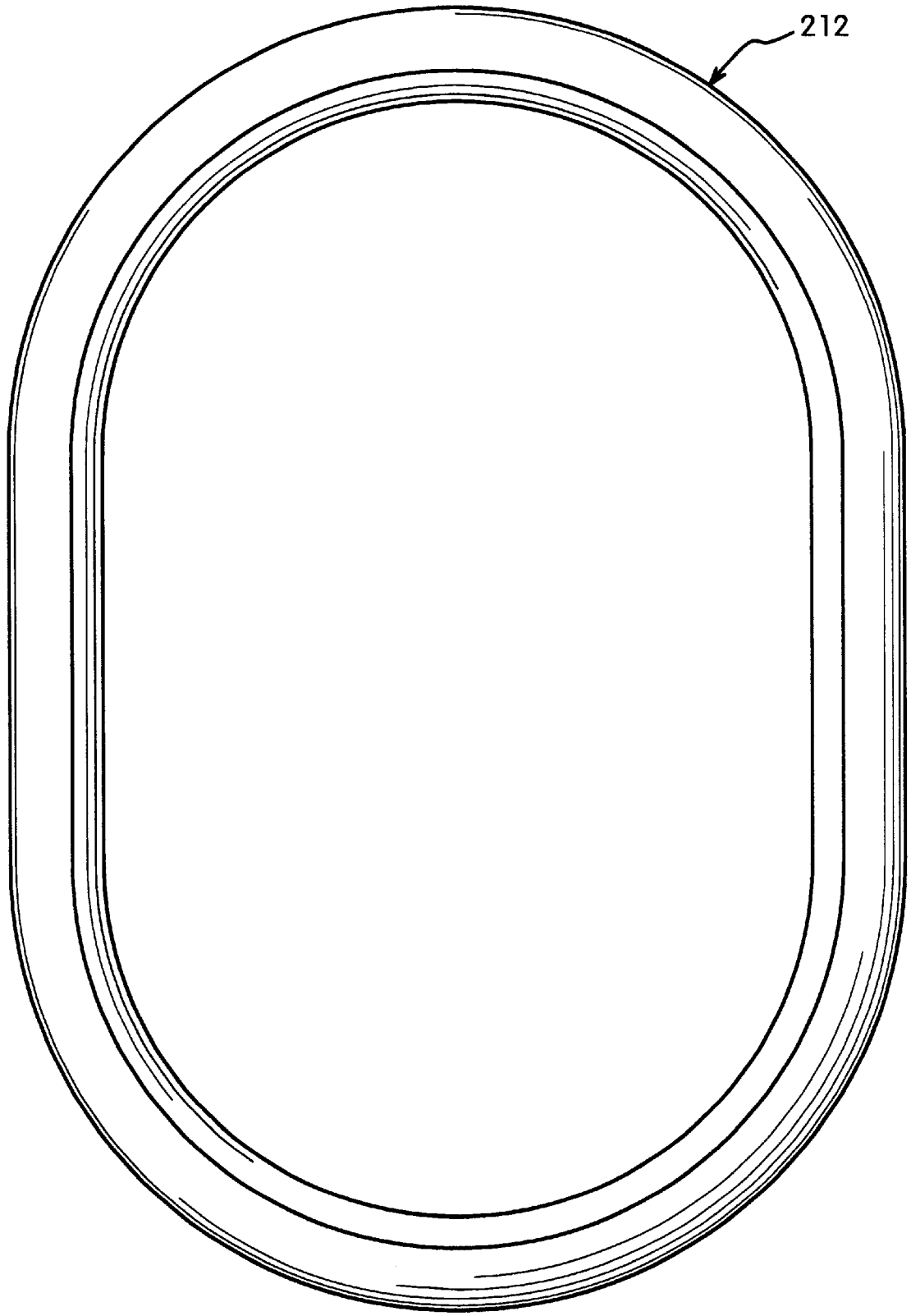
FIG. 15 is a left axial end elevational view of the annular sealing ring of the flange and seal assembly illustrated in FIGS. 11 and 12.

Referring now to FIGS. 8–10, a flange and seal assembly 110 is illustrated in accordance with a second embodiment of the present invention. The flange and seal assembly 110 basically includes an annular sealing ring 112 and a first flanged mounting component 114. The annular sealing ring 112 is retained by the first flanged mounting component 114 such that the annular sealing ring 112 and the first flanged mounting component 114 function as a single self-contained unit or component.

Basically, the flange and sealing assembly 110 is identical to the flange and sealing assembly 10, as discussed above, except that the first flanged mounting component 114 has been slightly modified, as explained below. Accordingly, the flange and seal assembly 110 will not be discussed and/or illustrated in detail herein. Rather, it would be apparent to those skilled in the art from this disclosure that the description of the first embodiment applies to this second embodiment except where explicitly stated that the second embodiment has been modified.

In this second embodiment of the present invention, the annular sealing ring 112 is identical to the annular sealing ring 12 of the first embodiment of the present invention. Similarly, the second flanged mounting component 116 is identical to the second flanged mounting component 16 of the first embodiment of the present invention. The first flanged mounting component 114, on the other hand, has been slightly modified in that the retaining element 152 is integrally formed of multiple radially extending lips of variable arc lengths.

Similar to the first embodiment, the first flanged mounting component 114 mates with a second flanged mounting component 116 of a piping system. Also, a pipe coupling device 120 is used to fixedly couple the first and second flanged mounting components 14 and 116 together in a conventional manner.

Referring now to FIGS. 11–15, a flange and seal assembly 210 is illustrated in accordance with a third embodiment of the present invention. The flange and seal assembly 210 basically includes an annular sealing ring 212 and a first flanged mounting component 214. The annular sealing ring 212 is retained by the first flanged mounting component 214 such that the annular sealing ring 212 and the first flanged mounting component 214 function as a single self-contained unit or component.

Basically, the flange and sealing assembly 210 is identical to the flange and sealing assembly 10, as discussed above, except the annular sealing ring 212 and the first flanged mounting component 214 have been slightly modified to be non-circular. Accordingly, the flange and seal assembly 210 will not be discussed and/or illustrated in detail herein. Rather, it would be apparent to those skilled in the art from this disclosure that the description of the first embodiment applies to this third embodiment except where explicitly stated that the third embodiment has been modified.

Similar to the prior embodiments, the first flanged mounting component 214 mates with a second flanged mounting component 216 of a piping system. Also, a pipe coupling device 120 is used to fixedly couple the first and second flanged components 114 and 116 together in a conventional manner.

Figure 16:
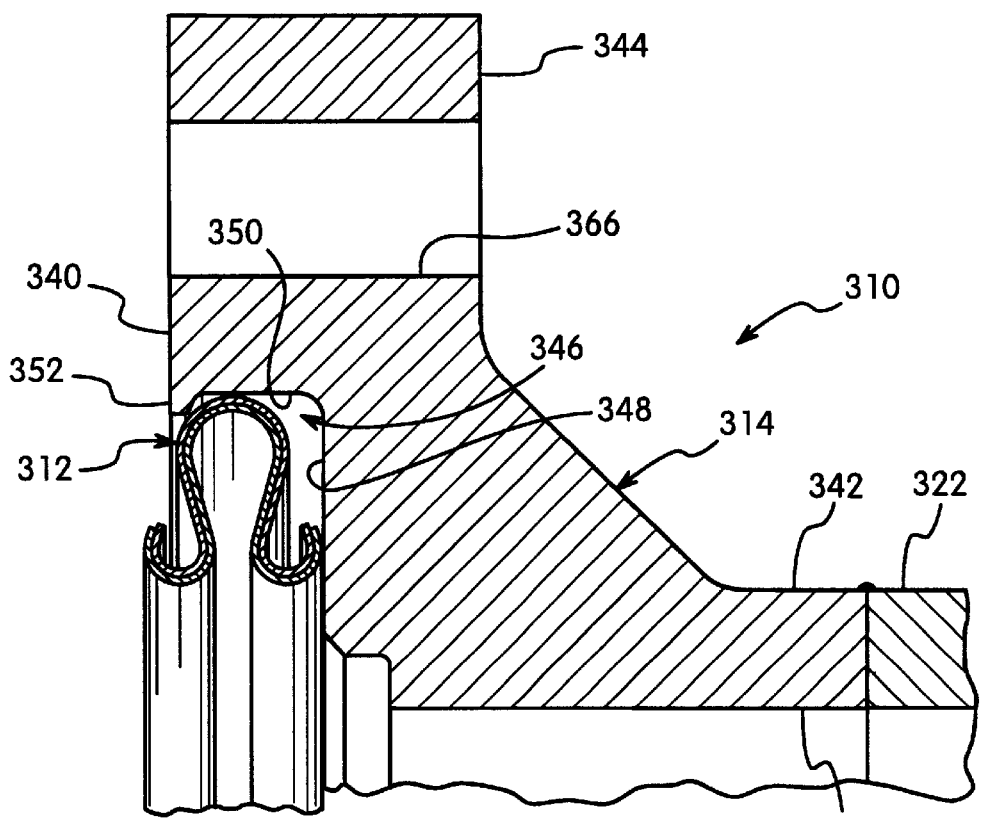
FIG. 16 is a partial enlarged cross-sectional view of a flange and seal assembly including an annular sealing ring and a flange mounting component coupled together as a single self-contained unit or component in accordance with a fourth embodiment of the present invention.
Figure 17:
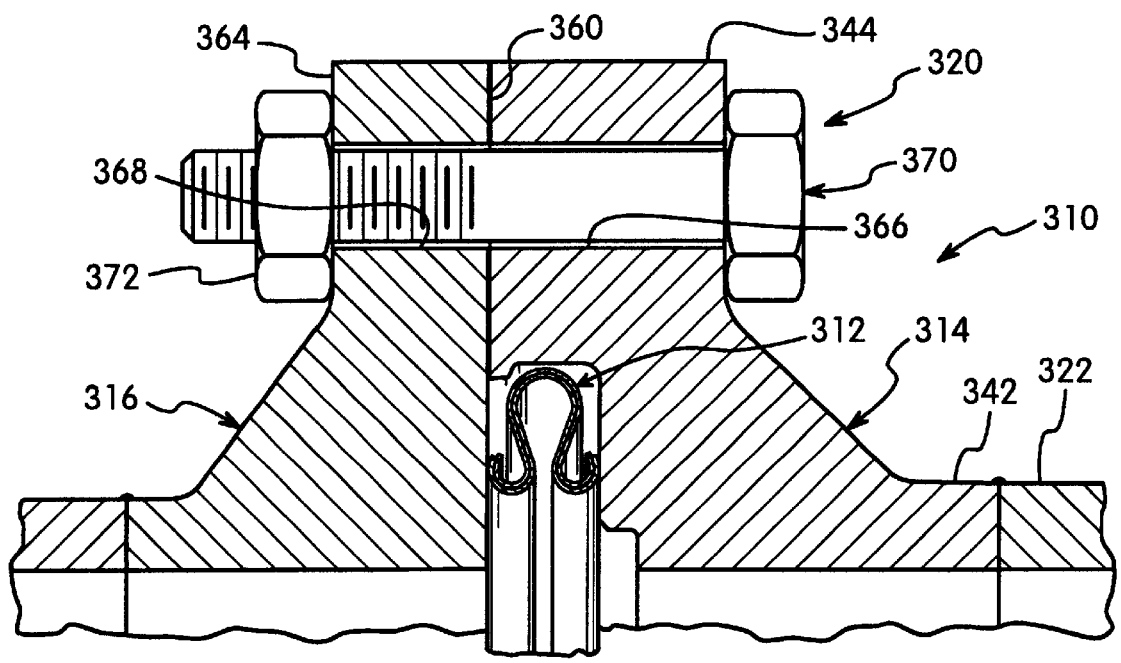
FIG. 17 is a partial cross-sectional view of the flange and seal assembly illustrated in FIG. 16 coupled to a mating flanged mounting component by a pipe coupling device.
Figure 18:
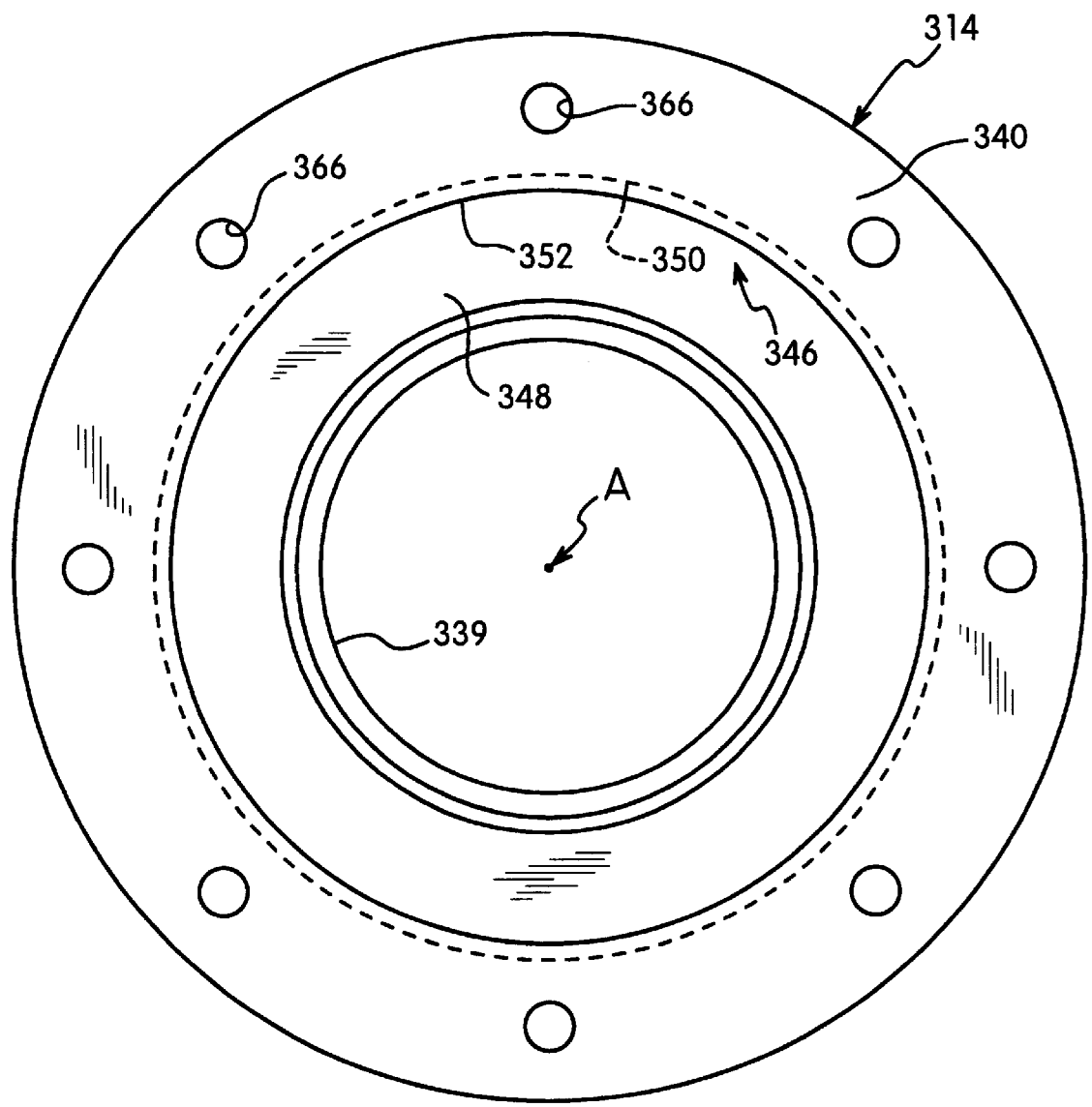
FIG. 18 is a left axial end elevational view of the flanged mounting component of the flange and seal assembly illustrated in FIGS. 16 and 17.

Referring now to FIGS. 16–18, a flange and seal assembly 310 is illustrated in accordance with a fourth embodiment of the present invention. The flange and seal assembly 310 basically includes an annular sealing ring 312, which is identical to the sealing ring 12, and a first flanged mounting component 314. The annular sealing ring 312 is retained by the first flanged mounting component 314 such that the annular sealing ring 312 and the first flanged mounting component 314 function as a single self-contained unit or component. Similar to the prior embodiments, the first flanged mounting component 314 mates with a second flanged mounting component 316 of a pipe system.

Basically, the flange and sealing assembly 310 is identical to the flange and seal assembly 10, as discussed above, except that the first flanged mounting component 314 and the second flanged mounting component 316 have been slightly modified to receive a pipe coupling arrangement 320, as explained below. Similar to the first embodiment, the first and second flanged mounting components 314 and 316 are continuous annular members. Accordingly, the flange and seal assembly 310 will not be discussed and/or illustrated in detail herein. Rather, it would be apparent to those skilled in the art from this disclosure that the description of the first embodiment applies to this fourth embodiment except where explicitly stated that the fourth embodiment has been modified.

In particular, the first flanged mounting component 314 has an annular or peripheral mounting flange 344 extending outwardly in a radial direction from an outer surface of a first open mounting end 340. The annular or peripheral mounting flange 344 includes a plurality of apertures 366 extending through the mounting flange 344 in directions that are parallel to the center longitudinal axis A of the first flanged mounting component 314. Preferably, the apertures 366 are equally spaced apart along an imaginary circle in the circumferential direction along an imaginary circle that is concentric with the center longitudinal axis of the first flanged mounting component 314.

As seen in FIGS. 16 and 18, the first flanged mounting component 314 is preferably a tubular member that includes an interior passage 339 extending between a first open mounting end 340 and a second open mounting end 342. The first end 340 is adapted to be fixedly coupled to the second flanged mounting component 316 by the pipe coupling arrangement 320. The second end 342 is adapted to be fixedly coupled to the first pipe 322 by welding. The first end 340 has an annular or peripheral mounting flange 344 extending outwardly in a radial direction from outer surface of the first mounting end 340. The first mounting end 340 also has an annular seal receiving recess 346 formed concentric with the interior passage 339 at the first mounting end 340. The annular seal receiving recess 346 is basically defined by an axially facing seal contacting surface 348, a peripheral surface 350 extending in an axial direction from the seal contacting surface 348, and a retaining element 352 extending inwardly in a radial direction from the peripheral surface 350.

Referring now to FIG. 17, the second flanged mounting component 316 is shown to be different from the second flanged mounting component 16 of the first embodiment. Specifically, the second flanged mounting component 316 has a first mounting end 360 and an annular mounting flange 364 that extends outwardly from the first mounting end 360. The annular or peripheral mounting flange 364 includes a plurality of apertures 368 (only one illustrated) extending through the mounting flange 364 in directions that are parallel to the center longitudinal axis of the second flanged mounting component 316. Preferably, the apertures 368 are equally spaced apart along an imaginary circle in the circumferential direction along an imaginary circle that is concentric with the center longitudinal axis of the second flanged mounting component 316.

In this embodiment, the pipe coupling arrangement 320 includes a plurality of bolts 370 (only one illustrated) and a plurality of nuts 372 (only one illustrated) that clamp the mounting flanges 344 and 364 together. The bolt 370 is illustrated as being inserted through the aperture 366 of the first flanged mounting component 314 and then through the aperture 368 of the second flanged mounting component 316. The nuts 372 are illustrated as being secured to the bolts 370 to apply a compressive force holding the first and second flanged mounting components 314 and 316 together. In other words, the apertures 366 and 368 are dimensioned to receive bolts 370 therethrough to fixedly secure the first and second flanged mounting components 314 and 316 together. Of course, it will be apparent to those skilled in the art from this disclosure that other types of pipe coupling arrangements can be used for securing the first and second flanged mounting components 314 and 316 together. When the first and second flanged mounting components 314 and 316 are secured together by the pipe coupling arrangement 320, the annular sealing ring 312 is compressed in the same manner as the first embodiment.

In the above mentioned embodiments, the terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A flange and seal assembly comprising:

an annular pressure energized sealing ring including a first leg portion having a first seal end with a first annular sealing surface facing in a first axial direction, a second leg portion having a second seal end with a second annular sealing surface facing in a second axial direction and an internally pressure energized center connecting portion located between said first and second leg portions; and a mounting component including a mounting end with a mounting flange extending outwardly from said mounting end, an annular seal receiving recess formed in an axial end surface of said mounting end to surround an interior area of the mounting component, and a retaining element extending from said mounting end, said center connecting portion of said sealing ring being axially retained between said retaining element and said axial end surface of said mounting end such that a majority of said center connecting portion is disposed between said retaining element and said axial end surface of said mounting end, and such that said first axially facing sealing surface is located adjacent an axially facing seal contacting surface of said seal receiving recess.

2. The flange and seal assembly according to claim 1, wherein said retaining element is integrally formed as a non-separable part of said mounting end.

3. The flange and seal assembly according to claim 1, wherein said retaining element includes a continuous annular lip.

4. The flange and seal assembly according to claim 1, wherein said retaining element includes a plurality of radially extending lips.

5. The flange and seal assembly according to claim 1, wherein said second annular sealing surface is located further from said seal contacting surface of said seal receiving recess than said retaining element as measured along a center axis of said sealing ring.

6. The flange and seal assembly according to claim 1, wherein said sealing ring is formed of a metallic material.

7. The flange and seal assembly according to claim 1, wherein said mounting component is a tubular conduit.

8. The flange and seal assembly according to claim 1, wherein said mounting flange of said mounting component has an annular tapered contact surface disposed on an opposite side of said mounting flange relative to said seal receiving recess.

9. The flange and seal assembly according to claim 1, wherein said mounting flange of said mounting component has a plurality of bolt apertures extending axially through said mounting flange.

10. The flange and seal assembly according to claim 1, wherein said first and second annular sealing surfaces are substantially circular.

11. The flange and seal assembly according to claim 10, wherein said second annular sealing surface is located further from said seal contacting surface of said seal receiving recess than said retaining element as measured along a center axis of said sealing ring.

12. The flange and seal assembly according to claim 11, wherein said retaining element is integrally formed as a non-separable part of said mounting end.

13. The flange and seal assembly according to claim 12, wherein said retaining element includes a continuous annular lip.

14. The flange and seal assembly according to claim 12, wherein said retaining element includes a plurality of radially extending lips.

15. A flange and seal assembly comprising:

an annular pressure energized sealing ring including a first leg portion having a first seal end with a first annular sealing surface facing in a first axial direction, a second leg portion having a second seal end with a second annular sealing surface facing in a second axial direction and an internally pressure energized center connecting portion located between said first and second leg portions; and a mounting component including a mounting end with a mounting flange extending outwardly from said mounting end, an annular seal receiving recess formed in an axial end surface of said mounting end to surround an interior area of the mounting component, and a retaining element extending from said mounting end, said center connecting portion of said sealing ring being axially retained between said retaining element and said axial end surface of said mounting end such that said center connecting portion is disposed between said retaining element and said axial end surface of said mounting end with a space formed between said center connecting portion and said retaining element, and such that said first axially facing sealing surface is located adjacent an axially facing seal contacting surface of said seal receiving recess.

16. The flange and seal assembly according to claim 15, wherein said mounting flange of said mounting component has an annular tapered contact surface disposed on an opposite side of said mounting flange relative to said seal receiving recess.

17. The flange and seal assembly according to claim 15, wherein said mounting flange of said mounting component has a plurality of bolt apertures extending axially through said mounting flange.

18. A flange and seal assembly comprising:

an annular pressure energized sealing ring including a first leg portion having a first seal end with a first annular sealing surface facing in a first axial direction, a second leg portion having a second seal end with a second annular sealing surface facing in a second axial direction and an internally pressure energized center connecting portion located between said first and second leg portions; and a mounting component including a mounting end with a mounting flange extending outwardly from said mounting end, an annular seal receiving recess formed in an axial end surface of said mounting end to surround an interior area of the mounting component, and a retaining element extending from said mounting end, said center connecting portion of said sealing ring being axially retained between said retaining element and said axial end surface of said mounting end such that said first axially facing sealing surface is located adjacent an axially facing seal contacting surface of said seal receiving recess, said center connecting portion being configured relative to said mounting component such that a first space is formed between said center connecting portion and a second space is formed between said center connecting portion and said retaining element when said sealing ring is axially compressed.

19. The flange and seal assembly according to claim 18, wherein said mounting flange of said mounting component has an annular tapered contact surface disposed on an opposite side of said mounting flange relative to said seal receiving recess.

20. The flange and seal assembly according to claim 18, wherein said mounting flange of said mounting component has a plurality of bolt apertures extending axially through said mounting flange.

\* \* \* \* \*